(12) United States Patent
Weiss et al.

(10) Patent No.: US 10,021,457 B2
(45) Date of Patent: Jul. 10, 2018

(54) SYSTEM AND METHOD FOR ENGAGING A PERSON IN THE PRESENCE OF AMBIENT AUDIO

(71) Applicant: Mobile Research Labs, Ltd., Hod Hasharon (IL)

(72) Inventors: Aron Weiss, Ramat Hasharon (IL); Omri Halevi, Mazkeret Batya (IL); Hezi Manus, Givatayim (IL); Dave Springer, Petah Tikva (IL)

(73) Assignee: Mobile Research Labs, Ltd., Hod Hasharon (IL)

( * ) Notice: Subject to any disclaimer, the term of this patent is extended or adjusted under 35 U.S.C. 154(b) by 183 days.

(21) Appl. No.: 15/054,678

(22) Filed: Feb. 26, 2016

(65) Prior Publication Data

US 2016/0179466 A1   Jun. 23, 2016

Related U.S. Application Data

(60) Division of application No. 14/611,811, filed on Feb. 2, 2015, now Pat. No. 9,306,689, which is a
(Continued)

(51) Int. Cl.
*H04N 21/4722* (2011.01)
*G06F 17/30* (2006.01)
*H04H 60/64* (2008.01)
*H04H 60/65* (2008.01)
*H04H 60/58* (2008.01)
(Continued)

(52) U.S. Cl.
CPC ... *H04N 21/4722* (2013.01); *G06F 17/30026* (2013.01); *G06F 17/30743* (2013.01); *G06F 17/30755* (2013.01); *G06F 17/30758* (2013.01); *G06Q 30/02* (2013.01); *H04H 60/58* (2013.01); *H04H 60/64* (2013.01); *H04H 60/65* (2013.01);
(Continued)

(58) Field of Classification Search
CPC ........ H04H 60/58; H04H 60/63; H04H 60/64; H04H 60/65; G06F 17/30743; G06F 17/30755; G06F 17/30758; G06F 17/30026; G06F 3/16; G06Q 20/145; G06Q 30/0201; G06Q 30/0252; G10L 19/018; H04N 21/41407; H04N 21/42203; H04N 21/4722
USPC ........................................ 700/94; 725/18, 19
See application file for complete search history.

(56) References Cited

U.S. PATENT DOCUMENTS 7,222,071 B2   5/2007  Neuhauser et al.
7,577,979 B2   8/2009  Feinleib et al.
(Continued)

*Primary Examiner* — Jesse A Elbin
(74) *Attorney, Agent, or Firm* — Finnegan, Henderson, Farabow, Garrett & Dunner LLP

(57) ABSTRACT

A computerized method for engaging a user of a mobile computer system. The mobile computer system may be connectible to a server over a wide area network. An audio signal of ambient audio is autonomously sampled in the vicinity of the mobile computer system to capture one or more audio samples of the audio signal. The multiple samples of the audio signal are autonomously sampled without requiring any interaction from the user, thus avoiding an input from the user to capture each of the samples. The audio sample may be processed to extract an audio signature of the audio sample. The audio signature may be compared with multiple previously stored reference audio signatures. Upon matching the audio signature with at least one reference audio signature a matched reference audio signature may be produced.

8 Claims, 7 Drawing Sheets

Related U.S. Application Data continuation of application No. 13/226,135, filed on Sep. 6, 2011, now Pat. No. 8,948,895.

(60) Provisional application No. 61/380,232, filed on Sep. 5, 2010, provisional application No. 61/417,251, filed on Nov. 25, 2010, provisional application No. 61/447,713, filed on Mar. 1, 2011.

(51) Int. Cl.
*G06Q 30/02* (2012.01)
*G10L 19/018* (2013.01)
*H04H 60/40* (2008.01)

(52) U.S. Cl.
CPC ............ *G10L 19/018* (2013.01); *H04H 60/40* (2013.01); *H04H 2201/90* (2013.01)

(56) References Cited

U.S. PATENT DOCUMENTS

| | | |
|---|---|---|
| 7,623,823 B2 | 11/2009 | Zito et al. |
| 7,706,838 B2 | 4/2010 | Atsmon et al. |
| 2007/0022437 A1 | 1/2007 | Gerken et al. |
| 2007/0124756 A1 | 5/2007 | Covell et al. |
| 2008/0208851 A1 | 8/2008 | Briggs et al. |
| 2008/0263579 A1 | 10/2008 | Mears et al. |
| 2009/0271829 A1 | 10/2009 | Larsson et al. |
| 2009/0305677 A1 | 12/2009 | Ellison et al. |
| 2010/0119208 A1 | 5/2010 | Davis et al. |
| 2011/0078729 A1 | 3/2011 | LaJoie et al. |
| 2011/0137976 A1 | 6/2011 | Poniatowski et al. |
| 2011/0273455 A1 | 11/2011 | Powar et al. |
| 2012/0317241 A1 | 12/2012 | Wang |
| 2015/0189368 A1 | 7/2015 | Lee et al. | ic
SYSTEM AND METHOD FOR ENGAGING A PERSON IN THE PRESENCE OF AMBIENT AUDIO

CROSS REFERENCE TO RELATED APPLICATIONS

The present application is a continuation of and claims the benefit of priority to U.S. patent application Ser. No. 14/611,811, filed on Feb. 2, 2015 (now allowed), which is a continuation and claims the benefit of priority to U.S. patent application Ser. No. 13/226,135, filed on Sep. 6, 2011, now U.S. Pat. No. 8,948,895, which claims the benefit of priority to U.S. Provisional Patent Application No. 61/380,232, filed Sep. 5, 2010, to U.S. Provisional Patent Application No. 61/417,251, filed Nov. 25, 2010, and to U.S. Provisional Patent Application No. 61/447,713, filed Mar. 1, 2011. The disclosures of the above referenced applications are incorporated by reference in their entireties.

BACKGROUND

1. Technical Field

The field of the present disclosure relates to ambient sound capture and a system and method for interacting with a person in the presence of ambient audio.

2. Description of Related Art

With the proliferation of social media platforms, users may be interested in sharing information about their media exposure.

Examples of such social media platforms include social networking systems, e.g. Facebook, myspace, etc.), professional networking systems, LinkedIn, virtual world platforms, e.g. Second Life, messaging systems (e.g., Google email (Gmail), Skype), blogging systems (e.g., Blogspot.com). Social networking has grown rapidly in popularity because of an "entertainment" factor which allows people to interact, communicate and share using multiple types of data and communication channels. For example, a number of social networking platforms provide one or more messaging tools, and photo and video sharing capabilities. Virtual worlds similarly host vibrant communities of people who interact, play, do business and even find romance online.

Media stations, such as radio stations and television stations, typically devote a portion of broadcast time to advertisements. Advertisement broadcast time is sold to advertisers, frequently through advertising agencies, and the sold broadcast time generates revenue for the media station. Advertisers use various marketing strategies to test and track advertisements to ensure that less effective advertisements are discontinued in favor of more effective advertising.

Broadcast media, such as radio and television, inherently provide only one-way flow of information, thus precluding information flow from, or about, the listener or viewer back to the broadcaster. Hence advertisements over such media are unidirectional and lack a facility to gain information from the listener or viewer, take an action, or allow a user to notify their friends in their social network, in response to the advertisement. In contrast, network-based systems, such as the Internet or telephone networks, do provide two-way communication and thus enable a listener or viewer to immediately respond to an advertisement and even to interact with it.

Hearing impaired individuals have difficulty with traditional platforms such as television, radio, live events, and other special situations, for example, emergency warnings (e.g. an air raid siren, or tsunami siren.

BRIEF SUMMARY

According to an aspect of the present disclosure there is provided a computerized method for engaging a user of a mobile computer system. The mobile computer system may be connectible to a server over a wide area network. An audio signal of ambient audio is autonomously sampled in the vicinity of the mobile computer system to capture one or more audio samples of the audio signal. The multiple samples of the audio signal are autonomously sampled without requiring any interaction from the user, thus avoiding an input from the user to capture each of the samples. The audio sample may be processed to extract an audio signature of the audio sample. The audio signature may be compared with multiple previously stored reference audio signatures. Upon matching the audio signature with at least one reference audio signature a matched reference audio signature may be produced. An action to engage the user may be performed, and/or data based upon the match may be logged. The action may be associated with the matched reference audio signature.

As part of autonomous sampling, the sampling may be paused when the mobile computer system or device is being used for another process, and the sampling may be autonomously restarted when the other process is complete. For example, if the mobile device is a telephone, sampling may be paused during a phone call or during other processes that rely on a microphone and/or speaker.

Embodiments of the invention may involve action intended to engage the user, such as: presenting to the user at least one data object of a universal resource locator (URL), a Web page, an active link to a Web page, a text message, a video message, an audio message, a multimedia message, an active link to a social network account, a message to or from a social network account, an advertisement, an interactive menu, an alarm a call to the mobile computer system, a cash transfer, a call to another computerized device and/or a vibration of the mobile computer system. Parameters may be stored for controlling the autonomous sampling by downloading the parameters from the server. The reference audio signatures may be previously stored by downloading from the server. Data object or a pointer to data object may be downloaded from the server. The data objects associated with the reference audio signatures, specify the action intended to engage the user. The comparison and matching of the reference audio signature to the audio signature of the ambient audio and the action intended to engage the user may be performed autonomously by the mobile computer system. Alternatively, audio signature may be uploaded to a server and the comparison with and matching with the reference signature may be performed by the server. When the server matches the audio signature to one of the reference signatures, a data object may be downloaded or a pointer to the data object (which points to data storage in the mobile computer system) which specifies the action to be performed to engage the user.

Optionally, multiple reference signatures may be extracted from previously known audio content. A broadcast signal may be captured, sampled and processed at the server to extract from the broadcast signal a broadcast signature. The broadcast signature may be compared with the reference signatures. Upon matching the broadcast signature to the reference signature, a trigger event may be generated including a corresponding broadcast time of the trigger event. The broadcast time substantially equals the time of broadcast of the broadcast signal sample. The trigger event including the broadcast time may be transmitted to the mobile computer system. Meanwhile, audio samples may be cached by storing the audio sample with a corresponding time stamp in storage of the mobile computer system. Upon receiving from the server the trigger event including the broadcast time, the audio sample may be transmitted to the server if the time stamp may be within a previously defined real time interval including the broadcast time. Typically, the time interval may be less than five minutes or less than four minutes. The audio sample with the time stamp may be received at the server. At the server, the audio sample may be processed to extract the audio signature, the audio signature may be compared with the previously stored reference audio signatures, and the audio signature may be matched with the reference audio signature to produce the matched reference audio signature.

According to an aspect of the present disclosure, there is provided a mobile computer system configured to perform a computerized method for engaging the user of the mobile computer system. The mobile computer system may be connectible to a server over a wide area network. The mobile computer system includes a microphone, a processing unit attached to the microphone configured for autonomously sampling an audio signal of ambient audio in the vicinity of the mobile computer system to capture an audio sample of the audio signal. The autonomous sampling includes capturing multiple samples of the audio signal while avoiding a request from the user to capture each of the samples. The audio sample may be processed to extract an audio signature of the audio sample. The audio signature may be compared with multiple previously stored reference audio signatures. The audio signature may be matched with at least one reference audio signature to produce a matched reference audio signature. The processing unit may be configured to implement an action to engage the user. The action may be associated with matched reference audio signature.

The action intended to engage the user includes presenting to the user data object selected from the group consisting of: a universal resource locator (URL), a Web page, an active link to a Web page, a text message, a video message, an audio message, a multimedia message, an active link to a social network account, a message to or from a social network account, an advertisement, an alarm an interactive menu and/or a vibration of the mobile computer system.

Sampling parameters which control the autonomous sampling may include sampling rate, sampling frequency, and sampling duration. The sampling parameters may be adjustable by and downloadable from the server to the mobile computer system. The processing unit may include a signature extraction module for processing the audio sample to extract the audio signature of the audio sample. The processing unit may be configured to compare the audio signature with the previously stored reference audio signatures to produce the matched reference audio signature by matching the audio signature with the at least one reference audio signature. A data communications module may be configured to upload to the server the audio signature. The audio sample may be processed by the server to extract the audio signature of the audio sample. The audio signature may be compared with the reference audio signatures previously stored at the server. The audio signature may be matched by the server with the reference audio signature to produce the matched reference audio signature. The data communications module may be configured to download from the server at least one data object for performing the action to engage the user. The data object is associated with the matched reference audio signature.

The mobile computer system may include storage and a cache module for caching the audio sample by storing the audio sample with a corresponding time stamp in the storage. The data communications module may be configured to receive from the server a trigger event and a corresponding broadcast time. The data communications module may be configured to transmit the audio sample having the time stamp within a previously defined real time interval which includes the broadcast time of the trigger event. At the server, the audio sample may be processed to extract the audio signature. At the server, the audio signature may be compared with the previously stored reference audio signatures and the audio signature may be matched with at least one reference audio signature to produce a matched reference audio signature.

According to an aspect of the present disclosure, there is provided a server configured to perform a computerized method for engaging a user of a mobile computer system. The mobile computer system is connectible to the server over a wide area network.

A data communications module may be configured to download to the mobile computer system a sampling parameter. The sampling parameter may include: sampling rate, sampling frequency, sampling period and sampling duration. The sampling parameter may be adjustable by the server. The mobile computer system, based on the sampling parameter, is configured to autonomously sample an audio signal of ambient audio in the vicinity of the mobile computer system and to capture one or more audio samples of the audio signal while avoiding an input from the user. The audio sample(s) may be processed to extract an audio signature of the audio sample; the audio signature may be compared with a multiple previously stored reference audio signatures. The audio signature may be matched with at least one reference audio signature to produce a matched reference audio signature. The action to engage the user at the mobile computer system may be associated with the matched reference audio signature. The server includes a processing unit which may be configured to compare the audio signature with the previously stored reference audio signatures extracted from previously known audio content and to match the audio signature with the reference audio signatures to produce the matched reference audio signature. The data communications module may be configured to download a data object or a pointer to the data object to the mobile computer system for performing the action to engage the user. The action may be associated with the matched reference audio signature. The audio sample may be processed to extract the audio signature at the mobile computer system. The data communications module may be configured to receive the audio signature from the mobile computer system. The data communications module may be configured to receive the audio sample from the mobile computer system. The processing unit may be configured to process the audio sample and to extract the audio signature from the audio sample. The server includes storage which may store the reference audio signatures extracted from previously known audio content. A trigger event generator module may be configured for sampling and capturing a broadcast signal sample, for processing the broadcast signal sample to extract therefrom a broadcast signature, for comparing the broadcast signature to the reference signatures, and upon matching the broadcast signature to at least one of the reference signatures to generate a trigger event and a corresponding broadcast time of the trigger event. The data communications module may be configured to transmit the trigger event and the broadcast time to the mobile computer system. In response to the trigger event, the mobile computer system may be configured to transmit the audio sample having a time stamp within a previously defined real time interval which includes the broadcast time of said trigger event.

According to an aspect of the present disclosure there is provided a method of monitoring media exposure. The method may include enabling autonomous sampling of ambient audio in a vicinity of a mobile computing device to permit capture of audio signals associated with a plurality of differing media events, whereby during autonomous sampling, signal capture occurs in an absence of user intervention. Processing of the audio samples may be enabled in order to extract a plurality of audio signatures, wherein at least two of the audio signatures are each associated with differing media events. Each of the at least two audio signatures may be compared with a plurality of previously stored reference audio signatures in order to determine matches. Then, information may be output to reflect the user's exposure to the at least two differing media events.

The output of information the output of information may be provided to a social networking site associated with the user, to reveal the user's media exposure to other users. Alternatively, or additionally, the output of information may be provided to an organization that monitors media exposure. Such organizations may include, for example, advertisers, broadcasters, advertising consultants and media consultants.

Autonomous sampling of media exposure may occur at least over a period of hours in accordance with a sampling scheme.

According to embodiments of the present invention there may be provided a computer readable medium encoded with processing instructions for causing a processor to execute methods as disclosed herein.

BRIEF DESCRIPTION OF THE DRAWINGS

The invention is herein described, in a non-limiting manner, by way of example only, with reference to the accompanying drawings, wherein.

Figure 1:
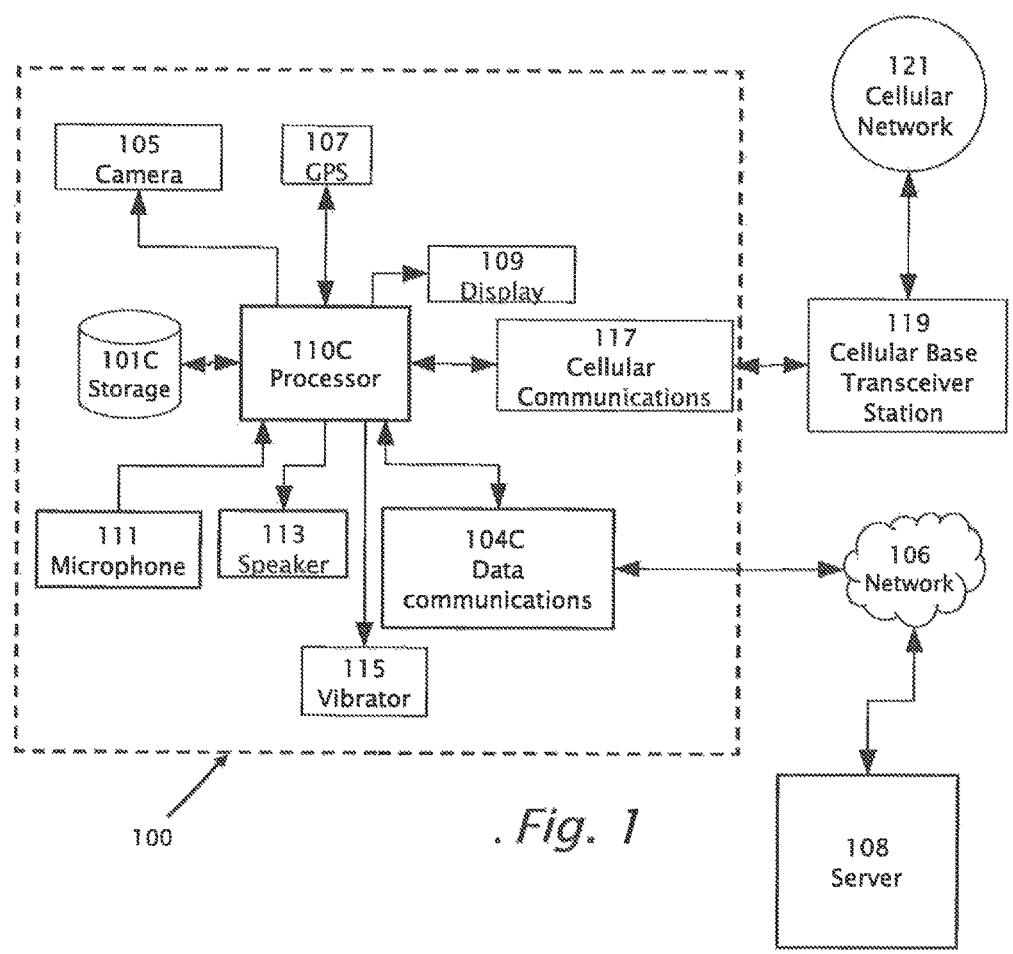
FIG. 1 illustrates a simplified block diagram of a mobile computer system according to features of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a phone or Personal Digital Assistant "PDA") where internal modules (such as a memory and processor) work together to perform operations on electronic data. While any computer system may be mobile, the term "mobile computer system" especially includes laptop computers, netbook computers, cellular telephones, smart phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

The term "server" as used herein refers to a computer system including a processor, data storage and a network adapter generally configured to provide a service over the computer network. A computer system which receives a service provided by the server may be known as a "client" computer system.

The articles "a", "an" is used herein, such as "a processor", "a server", a "sample" have the meaning of "one or more" that is "one or more processors", "one or more servers" and "one or more samples".

Before explaining embodiments of the invention in detail. It is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1A:
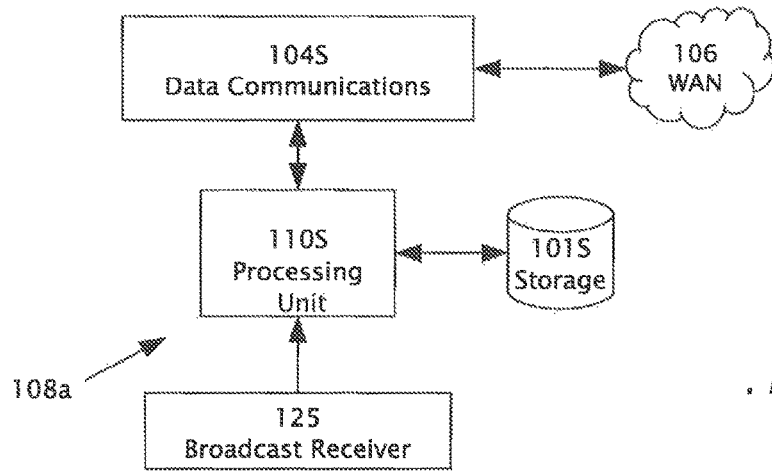
FIGS. 1A and 1B illustrates in more detail a server according to features of the present invention.

Referring now to the drawings, FIG. 1 illustrates a simplified block diagram of a mobile computer system 100 according to features of the present invention. Mobile computer system 100 is connectible over a network 106 to a server 108. Mobile computer system 100 is also connectible through a cellular base station transceiver 119 to cellular network 121. Mobile computer system 100 includes a processor 110C connected to local data storage 101C. A data communications module 104C operatively connects processor 110C to data network 106. A cellular communications module operatively connects processor 110C to cellular network 121. Mobile computer system 100 may include operatively connected to processor 110C peripheral accessory devices such as a display 109, global positioning system 107, a camera 105, a microphone 111, a speaker 113, a vibrator 115 and accelerometer/gravity sensor, Bluetooth, IR sensor (not shown). Reference is now also made to FIG. 1a which includes a simplified block diagram of a server 108a according to embodiments of the present invention. Server 108a includes a processing unit 110S connected to storage 101S and to a data communications module 104S which is connectible to network 106 e.g. wide area network or Internet. Server 108a may include an input from a broadcast receiver 125 and may receive an audio signal as a feed from broadcast receiver 125.

Figure 2A:
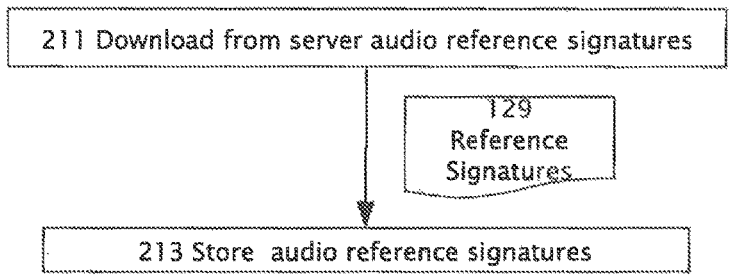
FIGS. 2A, 2B, 2C and 2D which are flow diagrams illustrating a method according to an embodiment of the present invention.
Figure 2B:
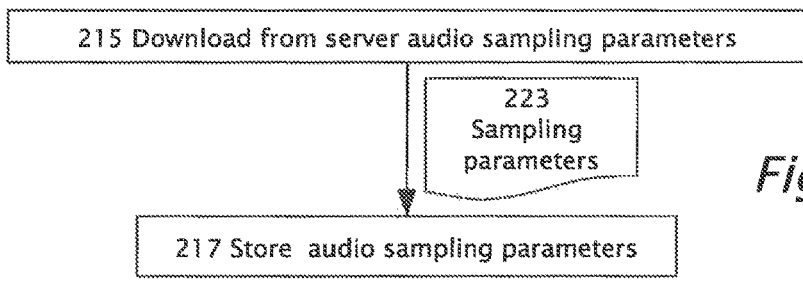
Figure 2C:
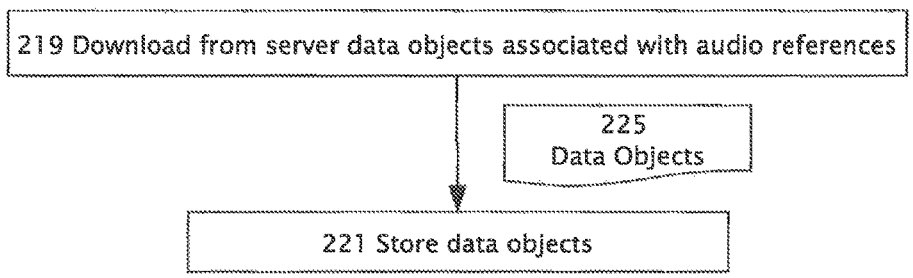
Figure 2D:
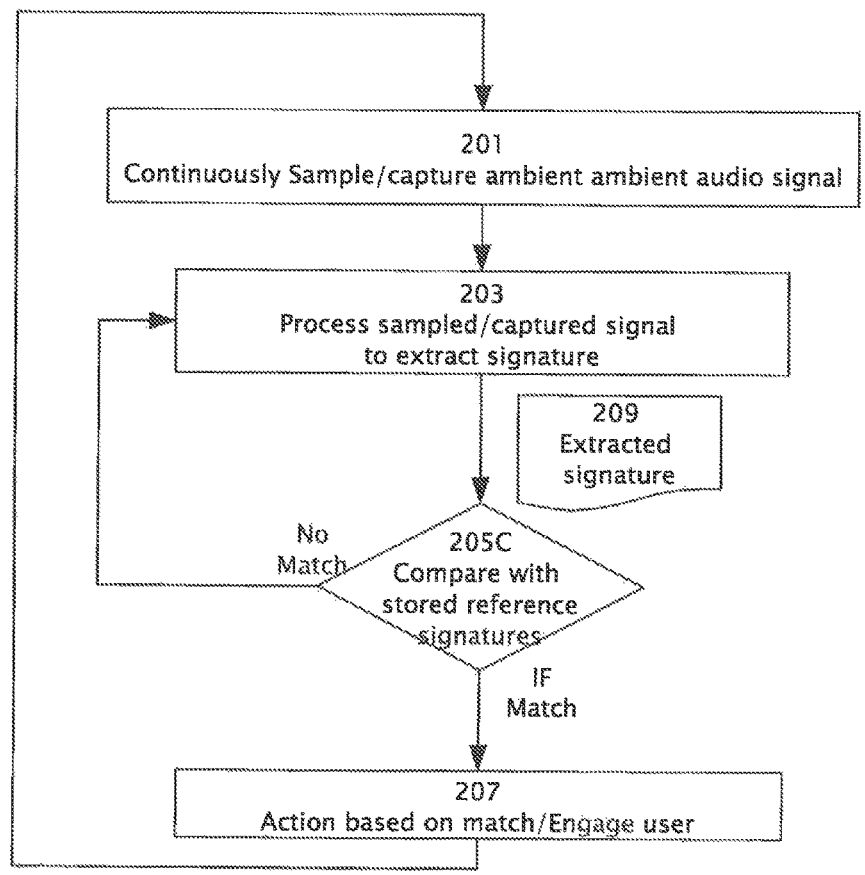

Reference is now made to FIGS. 2A,2B,2C and 2D which are flow diagrams illustrating a method according to an embodiment of the present invention. Referring now to FIG. 2D, in step 201, mobile computer system 100 is configured to autonomously sample ambient audio or sound in the vicinity of mobile computer system 100 using microphone 111, processor 110C and storage 101C. According to a feature of the present invention, the user powers up the mobile computer system 100, gives permission to run an application on mobile computer system 100 according to features of the present invention. The application runs for instance in the background to perform recording/capturing/sampling or storing of ambient audio autonomously without requiring any input from the user. Hereinafter the terms "recording, capturing and sampling are used herein interchangeably and refers to storage of the ambient audio information. The term "autonomously" as used herein in the present context refers to capture of one sample or multiple samples of the audio signal while avoiding or without requiring a request or input from the user to capture each of the samples. "Autonomous sampling" may include periodic sampling for instance, capturing an audio sample of one second duration during a ten second time interval, according to the sampling parameters stored in mobile computer system 100. According to a feature of the present invention, "autonomous" sampling may begin as soon as the sampling parameters are stored when the application is first installed in mobile computer system 100 without requiring the user to load the application.

According to a feature of the present invention, mobile computer system 100 may sense the ambient audio level and when the audio level increases over a threshold then sampling is performed without requiring an input from the user. The threshold may be previously determined or may be dynamically determined by sensing the ambient noise background.

The term "user" herein is the person in the vicinity of mobile computer system 100. Reference is now also made to FIG. 2B which illustrates a flow diagram according to features of the present invention. In step 215, server 108 downloads audio sampling parameters 223 and in step 217 the sampling parameters are stored in storage 101C. Sampling parameters 223 may include sampling rate, sampling frequency, sampling duration. Sampling parameters 223 may be adjusted by a server application run at server 108. The ambient audio information may be captured and stored in any known form, e.g. data format, including but not limited to raw data samples such a pulse code modulated (PCM) digitally sampled format, such as Waveform Audio File Format (WAVE, or more commonly known as WAV) or encoded formats for instance known as Windows Media Audio (WMA) or MP3, MP3 is an audio format that was designed by the Moving Picture Experts Group (MPEG). Other sampling parameters 223 are downloadable (in step 215) and adjustable by server 108 may include the form, e.g. PCM of audio capture and parameters specific to the form. Referring back to step 201 of FIG. 2D, "ambient audio" in the vicinity of mobile computer system 100 refers to an audio signal from any source human, animal, or machine. The audio signal may emanate from speakers connected to another computer system. The audio source may for instance be an alarm such as a doorbell or an air-raid siren. The source of ambient audio signal may be a live broadcast receiver, such as a television or radio program or advertisement provided synchronously at multiple broadcast receivers. The audio source may be previously recorded and asynchronous such as at the cinema. Referring now to step 203 in FIG. 2D, the captured audio signal sample is processed to extract an audio signature 209. Various methods for extracting an audio signature from audio samples are known in the art.

For example U.S. Pat. No. 4,677,466 discloses a number of methods to extract an audio signature from audio signals received from broadcasts. In decision block 205, extracted signature 209 is compared with previously stored reference signatures. If there is a match with one of the the reference signatures, then the ambient sound may be identified and action (step 207) based on the match to engage the user is performed. The action to engage the user may include but is not limited to visual message on display 109 in the form of universal resource locator (URL), a Web page, an active link to a Web page, a text message, a video message. Alternatively, or in addition, action (step 207) may include an audio message, a multimedia message or an alarm using speaker 113. Action (step 207) to engage the user may include alternatively, or in addition an active link to a social network account, a message to or from a social network account, an advertisement, an interactive menu, a call to the mobile computer system, a call to another computerized device over cellular network 121 and/or a vibration of mobile computer system 100 using vibrator 115.

Reference is now made to FIG. 2A which illustrates further aspects of the present invention. Reference signatures may be generated by processing reference audio samples and extracting the reference signatures. Reference signatures of the reference audio sample may be stored at server 108 and downloaded (step 211) from server 108 to storage 101C in mobile communication system 100. Reference is now made to FIG. 2C which illustrates another aspect of the present invention. Data objects are typically associated with the audio references or reference signatures 129. The data objects specify the action which engages the user. Data objects may be downloaded from server 108 to storage 101C in mobile communication system 100.

In an example of the method of FIGS. 2A-2D, a reference audio signature 129 of an air raid siren of is downloaded (step 211) and stored (step 213) in mobile computer system 100. A data object 225 associated with an air-raid siren causes a vibration of mobile computer system 100 and display of the words AIR RAID on display 109. Using a method as illustrated in FIGS. 2A-2D a hearing impaired person who otherwise would be dependent on others may be assisted with use of mobile computer system 100 which responds with an alarm to the ambient air raid siren. Mobile computer system 100 autonomously samples (step 201) ambient audio, and the ambient audio is processed to extract audio signatures 209. If the ambient audio signature matches (step 205) the previously stored reference signature 129 for the air raid siren then an action 207 which is specified by associated data object 225 causes the vibration and flashing display of the words "air raid" on display 109.

Figure 3A:
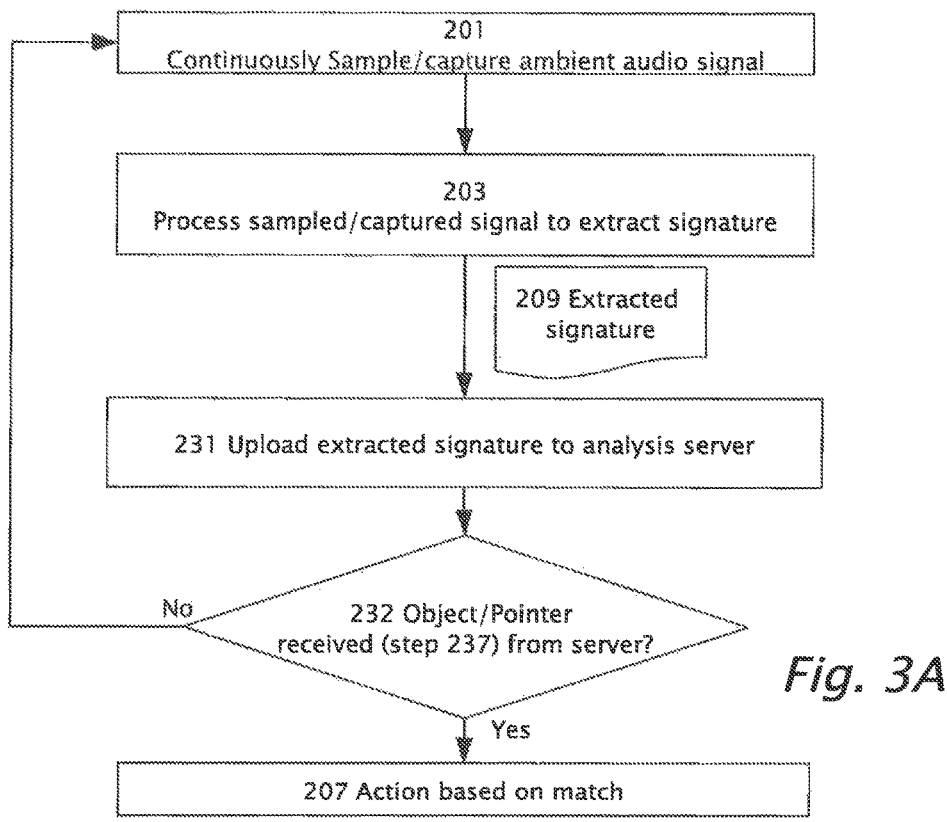
FIGS. 3A and 3B illustrate another variation of the method of the present invention.
Figure 3B:
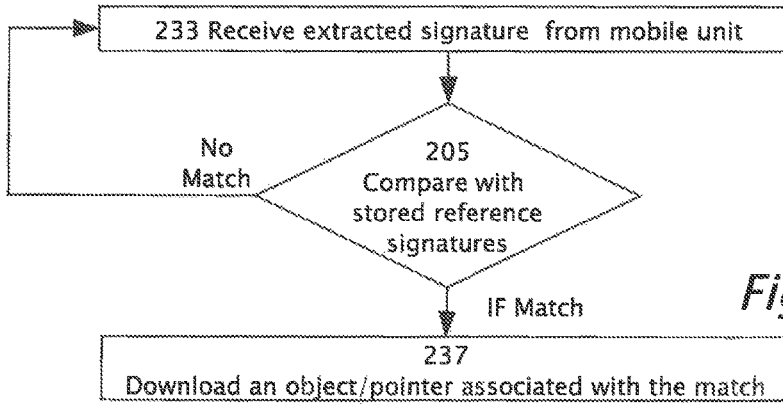

Reference is now made to FIGS. 3A and 3B which a variation of a method of the present invention. FIG. 3A generally illustrates a sub-process being performed by mobile computer system 100 and FIG. 3B generally illustrates a parallel sub-process being performed at server 108. Referring back to FIG. 1A, broadcast receiver 125 may provide an audio feed in raw or encoded/compressed form of a media broadcast to processing unit 110S. Processing unit 110S may sample and process the broadcast audio feed and store accordingly reference signatures in storage 101S optionally with time stamps. Mobile computer system 100 autonomously samples (step 201) ambient audio and the ambient audio is processed autonomously in real time to extract audio signatures 209 of the ambient audio. The extracted signatures 209 are uploaded (step 231) over network 106 or cellular network 121 to analysis server 108. In step 233, the extracted audio signatures 209 are received together with time stamps and other relevant data. Comparison 205 with reference signatures may be performed at server 108. If a match occurs then a data object or pointer to a data object which may already be stored in mobile computer system 100 may be downloaded. If in decision box 232, a data object or pointer is received then an action may be performed (step 207) to engage the user.

According to a feature the method of FIGS. 3A and 3B may be applied to media broadcasts in real time or near real time. The time stamps of the extracted audio samples 208 may be calibrated with the time stamp of the reference signature taking into account small delays between reception at various receivers. The time stamp calibration or time alignment may be used for performing the comparison and match (step 205). As an example of the method of FIGS. 3A and 3B, President Obama appears on television in a live broadcast. President Obama's media advisers prepared a questionnaire, for the listeners of the President's speech. Referring back to FIG. 1A, broadcasts receiver 125 receives the audio signal of the speech and and reference signatures of the speech are stored at server 108a. Meanwhile, multiple mobile computer systems 100 similarly process the ambient audio of the President's speech and upload extracted signatures 209 to analysis server 108a. At server 108a, extracted signatures from mobile computer systems 100 are compared and if a match is found, the questionnaire (an example of data object 225) for instance in the form of an active link to a Web page is downloaded (step 237) to and received (step 232) by mobile computer systems 100.

Figure 1B:
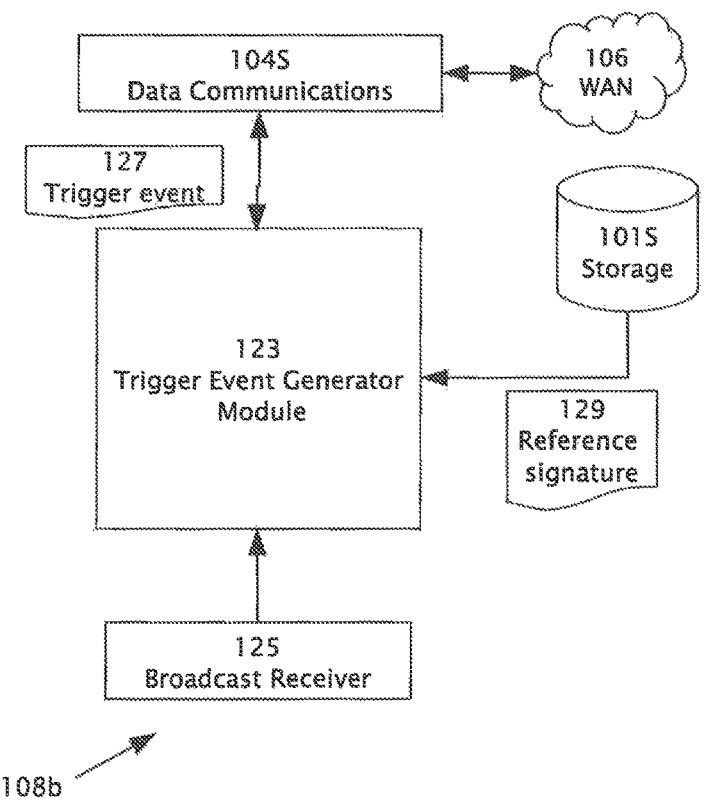
Figure 4A:
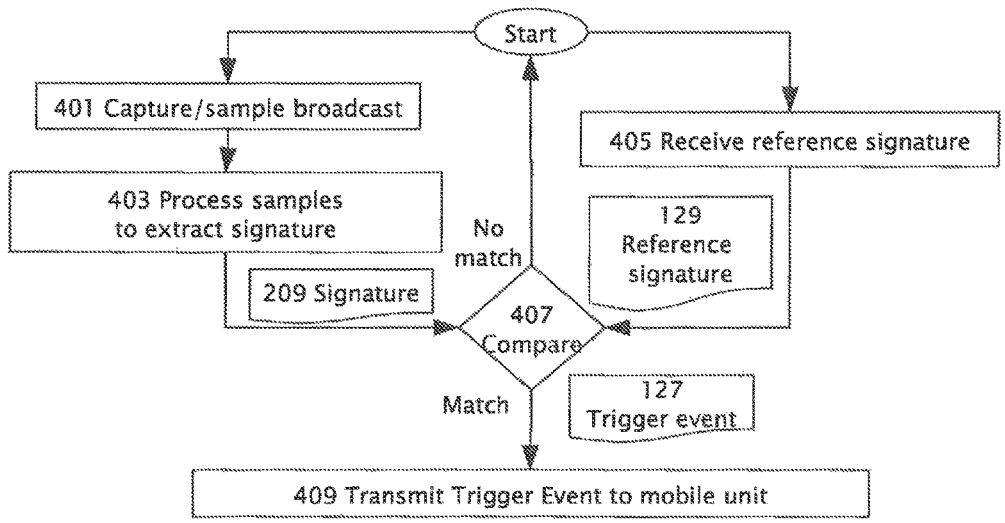
FIGS. 4A, 4B, 4C, and 4D illustrate a method according to another example of the present invention.
Figure 4B:
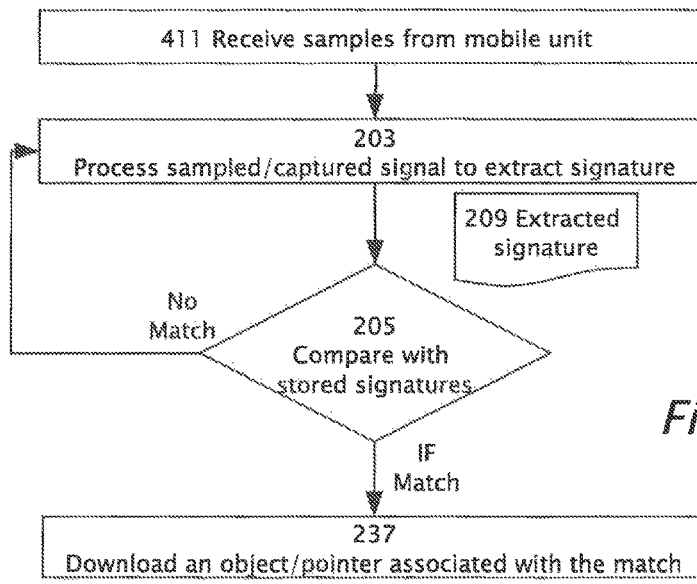
Figure 4C:
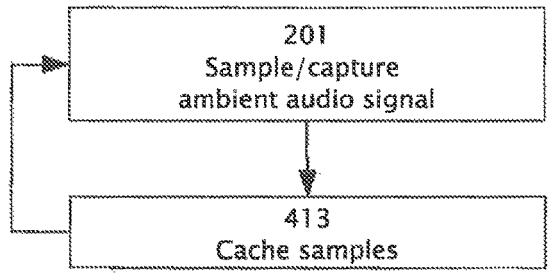
Figure 4D:
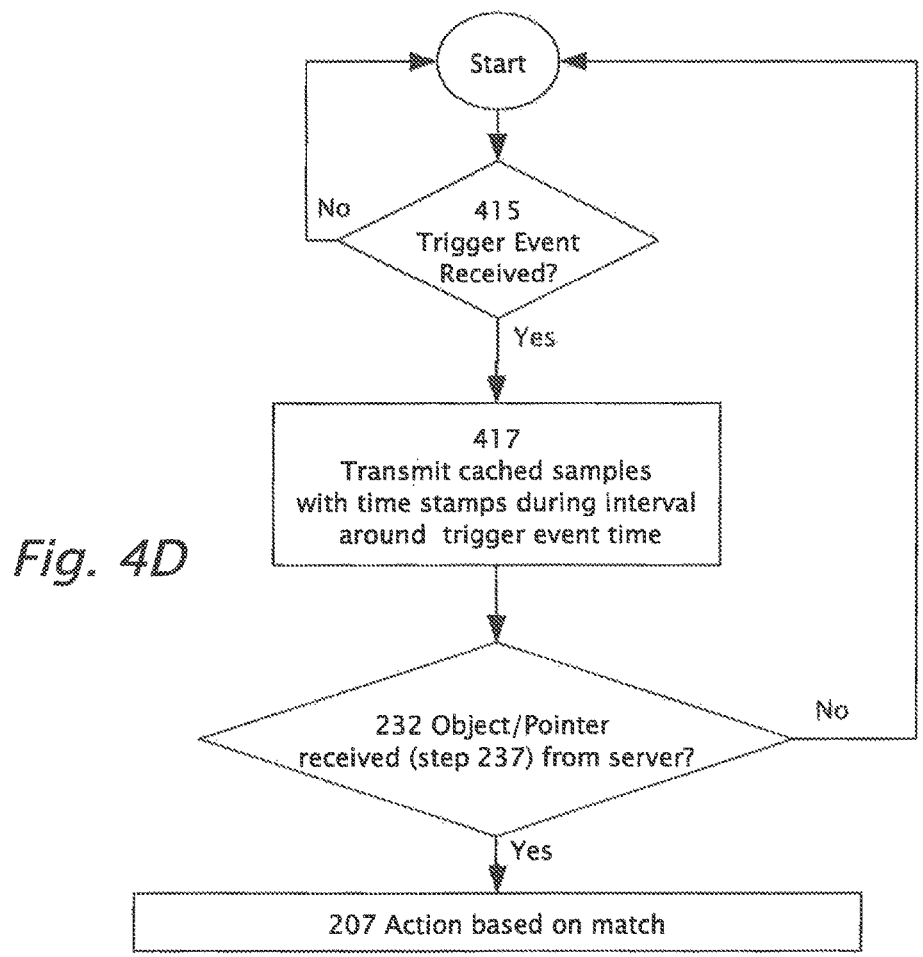

Reference is now made to FIG. 1B which illustrates a server 108b and FIGS. 4A,4B,4C, and 4D which combine to illustrate a method according to another example of the present invention. FIG. 1B includes a trigger event generator module 123 which may be implemented by processing unit 110S or a second server server 108a. Reference is now also made to FIG. 4A which illustrates a method of trigger event generation implemented by trigger event generator module 123. Trigger event generator module receives a feed from a broadcast receiver 125 and reference signatures 129 and outputs a trigger event 127. Trigger event generator 123 may capture and/or sample (step 401) the broadcast feed, process the sample to extract a signature 209. Trigger event generator 123 inputs one or more reference signatures 129 and compares with extracted signatures 209 from the broadcast feed. If there is a match then trigger event 127 is generated and transmitted (step 409) to mobile computer system 100. Reference is now made to FIG. 4C and FIG. 4D which illustrates parallel sub-processes being performed by mobile computer system 100. In step 201, ambient audio is captured by mobile computer system 100 and audio samples are cached (step 419). Reference is now made also to FIG. 4D. If trigger event 127 is received, then mobile computer system may respond for instance by transmitting (step 417) the cached samples received with time stamps during an interval which includes the time of the trigger event, for instance cached samples are transmitted (step 417) from mobile computer system 100 to server 108b when the time stamps of the cached samples are within two minutes before and one minute after the time stamp of trigger event 127. Reference is now also made to FIG. 4B which illustrates a continuation of the process. The audio samples (with time stamps within a time interval including the time of trigger event 127) are received (step 411) from mobile computer system 100 at server 108b. The samples are processed (step 203) to extract signatures 209. The extracted signatures are compared with stored reference signatures 129. If there is match then a data object is downloaded or a pointer to a data object is downloaded to mobile computer system 100. If there is no match in decision block 205 then the process may continue with processing audio samples (step 203) or waiting to receive (step 411) audio samples. The process continues as illustrated in FIG. 4D. At the mobile computer system, if a data object or pointer is received (decision block 232) then an action is performed (step 207) associated with the data object or pointer.

Embodiments of the present invention may find use in more detailed analysis of the extent of listener exposure to broadcasts or ambient audio. Mobile computer system 100 and/or server 108 may log exposure to ambient sounds and/or broadcasts. It may be determined not only that a broadcast was received, but whether the user/listener actually listened or paid attention to the sound or broadcast. Action 207 which is intended to engage the user and the response to action 207 may also be logged and used to gather more detailed information for research or other purposes.

Various embodiments of the invention may involve the "enabling" of certain activities, steps or functions. Enabling may occur either directly or indirectly. Examples of direct enabling include making, using, or ing a system or components of a system to achieve the associated activity, step or function; or operating or providing at least one processor in order to achieve the associated activity, step, or function. Examples of indirect enabling include sending or receiving signals (e.g., over a network) to a processor in order to achieve the associated activity, step or function; providing software to enable a user to participate in a system that achieves the activity, step, or function; and offering a service, system, application, or software such that the activity, step or function occurs as the result of a user's acceptance of that offer. Thus, one who provides or advertises a software download that, when used, directly or indirectly results in achievement of an associated activity, step or function, enables that function within the meaning of this disclosure.

For example, embodiments of the invention may include a method of monitoring media exposure, enabling autonomous sampling of ambient audio in a vicinity of a mobile computing device to permit capture of audio signals associated with a plurality of differing media events, whereby capture of audio signals associated with the plurality of differing media events is enabled to occur during a single autonomous sampling period characterized by an absence of user intervention between captured signals associated with the differing media events.

The term "mobile" computing device" as used herein, may include any portable device that includes a processor. Examples include mobile phones, tablets (e.g., IPad), laptops, netbooks, PDAs, and other mobile computer systems.

A single autonomous sampling period includes any time period that, once begun, does not necessarily require an act of human intervention in order for sampling to continue, regardless of whether the sampling period is continuous or made up of a series of discrete sampling segments. Thus, an autonomous sampling period may be said to exist when multiple media events may be sampled without the user selecting each individual event for sampling.

As used herein, a "media event" includes a television program, radio program, movie, show, commercial, infomercial, Internet-based broadcast, Internet-based advertisement, live event, for example sport event, concert or political rally, or any discrete portion or portions thereof, regardless of whether reproduced or presented on television, radio, in a cinema, in a private or public transport vehicle, at a live performance or other public event, via satellite (e.g., Dish Network, Serius/XM radio), over the Internet or another network, or through any other mechanism capable of reproducing audio.

Thus, autonomous sampling of ambient audio in a vicinity of a mobile computing device to permit capture of audio signals associated with a plurality of differing media events, may include the sampling of two differing events broadcast through two differing sources (e.g., TV and radio), or two differing events broadcast over the same source (e.g., TV show #1 and TV show #2). Differing media events may include a TV show and a commercial broadcast within the TV show.

Using embodiments of the invention it may be possible for a user's mobile computing device such as a cellular telephone, to monitor the user's media exposure for extended periods (e.g., continuous hours, full days, etc.) without necessarily requiring user intervention. For example, a user might opt-in such that whenever the user's mobile computing device is turned on, it is in a mode for enabling sampling of media exposure without human intervention. Alternatively, once the user affirmatively activates a sampling feature, the mobile computing device might autonomously sample without human intervention, until the feature is deactivated. In either instance, there is a "single autonomous sampling period" characterized by the fact that at least two media events may be sampled without intermediate intervention by the user between the two events.

The mobile computing device might implement a sampling scheme whereby sampling occurs at predefined intervals, periodically, randomly, or in response to an audible stimulus. The scheme might permit interruption of sampling when the mobile computing device is involved in another use, such as for a phone call. In this instance, the sampling scheme may remain transparent to the user, and therefore is considered autonomous within the meaning of this disclosure.

An embodiment of the invention may involve enabling processing of said audio signals to extract at least two audio signatures, each audio signature associated with a differing media event. An audio signature may be any signal or portion of a signal that serves as an identifier for a media event. So for example, one signature may serve as an identifier for one television show, and another signature might serve as an identifier for another television show. Multiple audio samples and audio signatures might be sampled and extract for each media event. Indeed, to determine whether a user continues to be exposed to a media event, continuous signatures might be generated for the same event.

Depending on desired configuration, signature extraction may occur at the client or server side. (e.g., mobile computing device or remote server). Regardless of where located, supplying a software application for a mobile phone, for example, is one example of enabling audio signature extraction.

Embodiments of the invention may enable a comparison of each of the at least two extracted audio signatures with a plurality of previously stored reference audio signatures to identify at least a first match between a first of the two extracted audio signatures and a first associated reference audio signature, and to enable at least a second match of a second of the two extracted audio signatures with a second associated reference audio signature. The previously stored reference audio signatures may be retained on the client side or server side, and may serve as an indicator for a media event. Thus, a determined match signals that the user is exposed to a known media event associated with that match.

After identifying the first match, embodiments of the invention may enable an output of first information reflective of the user's exposure to a first media event; and after identifying the second match, embodiments of the invention may enable output of second information reflective of the user's exposure to a second media event. Such output may take various forms. In one sense, the output may be raw data provided to indicate media exposure. This data may be provided to, for example, an advertiser, broadcaster, or consultant interested in aggregating information about media exposure. Alternatively, the information may be output to social media interface. In this way, a user's Facebook friends, for example, might be advised that the user is currently watching a particular television program. This information might then be used to prompt a discussion about the program, or to automatically place the user in a subgroup of individual (e.g., friends) who are watching the same show. The a method of the invention may involve outputting information to a social networking site associated with the user, in order to reveal the user's media exposure to other users.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We claim:

1. A mobile device, comprising:
   a microphone;
   a memory configured to store instructions; and
   at least one processor in communication with the microphone and configured to execute the instructions to cause the mobile device to:
   autonomously sample a first audio signal of ambient audio in a vicinity of a first device, the sampling including capturing a first audio signal sample without input from a user of the mobile device, and the first audio signal sample being associated with a first time stamp;
   receive, from a server, audio data associated with a trigger event and a second time stamp associated with the trigger event, the audio data being sampled by a second device;
   determine whether the first time stamp falls within a predetermined time interval that includes the second time stamp;
   compare, when the first time stamp falls within the predetermined time interval, a first audio signature representative of the first audio signal sample with a second audio signature corresponding to the received audio data; and
   transmit first information indicative of the determined correspondence between the first and second audio signatures to the server.

2. The mobile device of claim 1, wherein the instructions are further executed by the at least one processor to transmit, to the server, the first audio signal sample when the first time stamp falls within the predetermined time interval.

3. The mobile device of claim 1, wherein the instructions are further executed by the at least one processor to perform an action to engage the user when the first audio signature matches the second audio signature.

4. The mobile device of claim 3, wherein performing the action to engage the user includes presenting to the user at least one data object selected from the group consisting of: a universal resource locator (URL), a Web page, an active link to a Web page, a text message, a video message, an audio message, a multimedia message, an active link to a social network account, a message to or from a social network account, an advertisement, an interactive menu, an alarm, a call to the mobile device, a call to another device, and a vibration of the mobile device.

5. The mobile device of claim 4, wherein the instructions are further executed by the at least one processor to receive the at least one data object from the server.

6. The mobile device of claim 1, wherein autonomously sampling includes periodically capturing a predetermined number of audio samples over a predetermined period of time, and the predetermined number of captured audio samples includes at least the first audio signal sample.

7. The mobile device of claim 1, wherein the microphone is configured to determine an ambient audio level, and wherein autonomously sampling includes capturing the first audio signal sample if the ambient audio level exceeds a threshold.

8. The mobile device of claim 7, wherein:
   the microphone is further configured to determine an ambient noise level; and
   the instructions are further executed by the at least one processor to adjust the threshold based on the determined ambient noise level.

* * * * *